US008401968B1

(12) United States Patent  
Schattauer et al.

(10) Patent No.: US 8,401,968 B1
(45) Date of Patent: Mar. 19, 2013

(54) MOBILE GROUP PAYMENTS

(75) Inventors: Paul C. Schattauer, Seattle, WA (US); Gerald Yuen, Pasadena, CA (US); Philip Yuen, Bellevue, WA (US); Diwakar Gupta, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 630 days.

(21) Appl. No.: 12/056,513

(22) Filed: Mar. 27, 2008

(51) Int. Cl.
*G06Q 40/00* (2012.01)

(52) U.S. Cl. ........... 705/44; 705/30; 705/34; 705/35; 705/37; 705/45; 726/27; 713/193; 235/380

(58) Field of Classification Search .......... 705/35, 705/34, 37, 30, 45; 726/27; 713/193; 235/380
See application file for complete search history.

(56) References Cited

U.S. PATENT DOCUMENTS

| | | | | |
|---|---|---|---|---|
| 6,169,787 | B1* | 1/2001 | Shimada et al. | 379/91.01 |
| 7,219,148 | B2* | 5/2007 | Rounthwaite et al. | 709/224 |
| 7,287,007 | B1* | 10/2007 | Detering | 705/37 |
| 7,499,888 | B1* | 3/2009 | Tu et al. | 705/44 |
| 2001/0037257 | A1* | 11/2001 | Niki et al. | 705/26 |
| 2002/0038236 | A1* | 3/2002 | Schechter et al. | 705/12 |
| 2002/0156687 | A1* | 10/2002 | Carr et al. | 705/26 |
| 2002/0198806 | A1* | 12/2002 | Blagg et al. | 705/35 |
| 2004/0226992 | A1* | 11/2004 | Imanishi | 235/379 |
| 2004/0236651 | A1* | 11/2004 | Emde et al. | 705/34 |
| 2005/0027626 | A1* | 2/2005 | Garcia | 705/35 |
| 2005/0234781 | A1* | 10/2005 | Morgenstern et al. | 705/26 |
| 2005/0273405 | A1* | 12/2005 | Chen | 705/35 |
| 2007/0078760 | A1* | 4/2007 | Conaty et al. | 705/39 |
| 2007/0203836 | A1* | 8/2007 | Dodin | 705/44 |
| 2007/0208627 | A1* | 9/2007 | Abadi | 705/26 |
| 2007/0233589 | A1* | 10/2007 | Vasinkevich | 705/36 R |
| 2007/0271342 | A1* | 11/2007 | Brandt et al. | 709/206 |
| 2008/0013701 | A1* | 1/2008 | Barhydt et al. | 379/92.02 |
| 2008/0119162 | A1* | 5/2008 | Sivalingam et al. | 455/408 |
| 2008/0189189 | A1* | 8/2008 | Morgenstern | 705/26 |
| 2008/0215168 | A1* | 9/2008 | Charchian | 700/91 |

OTHER PUBLICATIONS

Buying or selling a member of a consolidated group.(part 2), Salem, Irving; Lee, Jiyeon; Pellervo, Patricia, Tax Executive, 51, 4, 324, Jul. 1999, ISSN: 0040-0025.*
First 'Verified by Visa' authentication services for mobile payment use Mobileway solution; The Mobile Transaction Tracker solution from Mobileway underpins the authentication of cardholders in the Verified by Visa service, M2 Presswire, p. NA, Feb. 25, 2003.*
Tira Wireless Scores with NHL PowerShot Hockey Game for Mobile Phones; NHL on a Breakaway with First Major North American Sporting League Branded Mobile Game, Business Wire, Mar. 24, 2003.*
Hull College to Automate Authorisation of 30,000 Invoices Each Year with Version One's Technology, M2 Presswire, p. NA, Feb. 18, 2008.*

* cited by examiner

*Primary Examiner* — Tien Nguyen
(74) *Attorney, Agent, or Firm* — Lee & Hayes, PLLC

(57) ABSTRACT

A mobile group payment service enables members of a group to access a group account. The group account may enable members to transmit funds, request funds, and perform account queries, and modify account settings, among other possible operations. A member may request a payment from the group account to a target account. A transaction authorization service may facilitate an authorization process to determine whether the requested payment is authorized by one or more of the other members of the group. Upon authorization, the requested payment may be completed by transferring funds to the target account.

25 Claims, 10 Drawing Sheets

| Member | Max No Authorize | Spending Detail Max Vote Majority | Max vote Unanimous | Limit |
|---|---|---|---|---|
| 202(1) | - | 100 | 200 | 400 |
| 202(2) | 50 | 10,000 | 10,000 | 10,000 |
| 202(3) | 50 | 10,000 | 10,000 | 10,000 |
| 202(P) | - | 200 | 200 | 500 |

720 ─↘

| | | 722 AUTHORIZE DETAIL 726 728 730 | | | |
|---|---|---|---|---|
| Member | May Vote | Always Vote | Absolute No | Random |
| 202(1) | Yes | No | No | Yes |
| 202(2) | Yes | Yes | Yes | Yes |
| 202(3) | Yes | Yes | Yes | Yes |
| 202(P) | Yes | No | No | Yes |

AUTHORIZE SETTINGS

734 → ○ AUTHORIZE RANDOM?
736 → ○ ABSOLUTE NO ACTIVE?
738 → ○ AUTHORIZE QUANTITY: ____
　　　　　OR
740 → ○ AUTHORIZE PERCENT: ____%

Fig. 7D

MOBILE GROUP PAYMENTS

BACKGROUND

Commerce depends on a vast number of financial transactions that distribute funds among participants such as merchants, customers, companies, and other entities. Traditional methods of conducting financial transactions commonly consisted of an exchange of currency, which may include paper currency, checks, credit cards, and electronic transfers. With each type of currency, a number of processes are typically necessary to fulfill a transaction. The processes may include a payment fulfillment process, paperwork, and processes performed by a banking institution, among other possible processes.

Typically, transaction accounts, such as bank accounts, are associated with a single entity, such as an individual, married couple, or business. Initializing transaction accounts and permissions often involve cumbersome processes that require time and paperwork, therefore making changes to accounts difficult and undesirable.

In more recent years, financial transactions have moved online onto the Internet, a worldwide system of computer networks. It is commonplace for entities to transfer payments across the Internet to complete a transaction. Often, such a transaction involves security risks such as receipt of payment by an unintended recipient and/or transmission by someone other than an account owner. In addition to the Internet, other electronic forms of communication enable payment transmission, such as mobile telephony including wired and wireless communications.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7C illustrates an example data structure of authorization details for members of the group account of FIG. 7A.

FIG. 7D illustrates an embodiment of authorization settings that may be associated with the transaction authorization service of FIG. 7A.

DETAILED DESCRIPTION

This disclosure is directed to techniques for group mobile payments which may enable a group of members to interact with a group transaction account. The members may be authorized to contribute deposits and/or initiate payments from the group account. The group account may facilitate mobile access over a network, such as the Internet, a cable network, or a wireless network. Some member interactions with the group account may require authorizations by one or more members of the group.

The techniques described herein may be implemented in a number of ways. Example implementations are provided below with reference to the following figures.

Illustrative System Architecture

Figure 1:
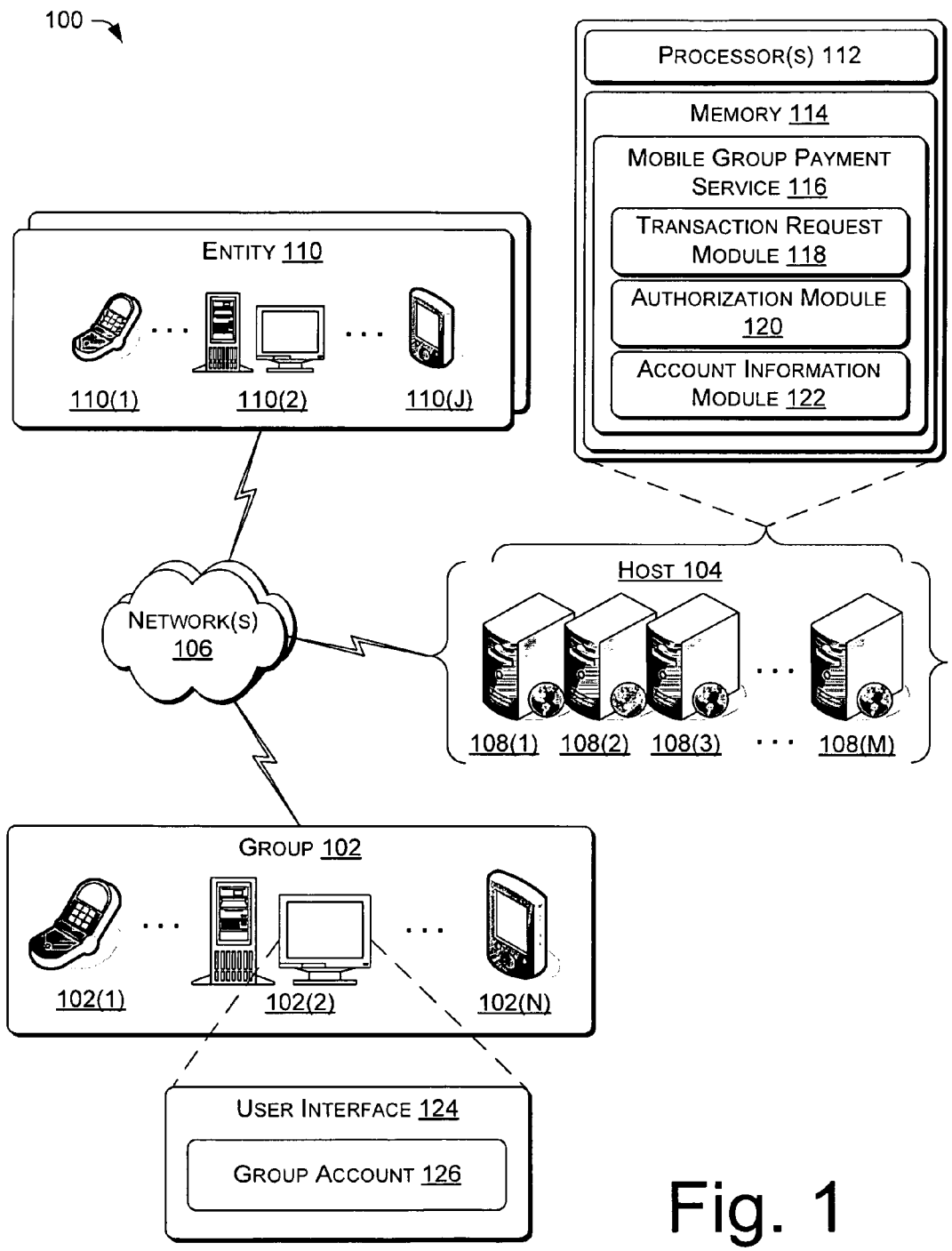
FIG. 1 illustrates an example architecture for providing a mobile group payment service to facilitate transactions using a group account.

FIG. 1 illustrates an example architecture 100 for providing a mobile group payment service to facilitate transactions using a group account. A group 102 includes client computing devices 102(1), . . . , 102(N) that access a host 104 via a network 106. The network 106 is representative of many different types of networks, such as cable networks, the Internet, local area networks, mobile telephone networks, wide area networks and wireless networks, or a combination of such networks.

The host 104 may be hosted on one or more servers 108(1), . . . , 108(M), perhaps arranged as a server farm. Other server architectures may also be used to implement the host 104. The host 104 is capable of handling requests from many users and serving, in response, various information and data to the user computing devices 102(1)-(N). The servers 108(1)-(M) include mobile group payment servers capable of facilitating interaction by the client devices 102(1)-(N) between the group 102 and a group account via the network 106. In this manner, the host 104 is representative of essentially any site supporting user interaction, including online ecommerce payment services, and so forth.

The client devices 102(1)-(N) (or simply "clients") may be implemented in any number of ways. In FIG. 1, the devices are illustrated as a wireless phone 102(1), a personal computer 102(2), and a portable digital assistant (PDA) 102(N). But, other example implementations include a television set-top box, a game console, a portable gaming device, a digital video recorder, a portable computer, and other electronic or entertainment devices.

Users employ the client devices 102(1)-(N) to interact with the group account residing on the host 104. In one scenario, the client device 102(1)-(N) sends a request (such as a uniform resource identifier (URI) request) to the servers 108(1)-(M). Upon receiving the request, the servers return a page (or other communication) to a requesting client device 102(1)-(N), allowing the user to interact with the data provided by the servers. For example, a returned page may include links that enable the client device to request information related to the group account. In addition or alternatively, the returned page may include links that enable the client device to engage in transactions with an entity 110. The entity 110 may include entity computing devices 110(1), . . . , 110(J) to enable interaction with the host 104 and/or the group 102 via the network 106.

Other user interfaces, such as dedicated applications implemented using software instructions and stored locally on the client device 102(1)-(N), may be used to interact with the host 104. Further, the client device 102(1)-(N) may use simple text commands, such as simple messaging service (SMS) text messages to communicate with the host 104.

As illustrated, the servers 108(1)-(M) are equipped with one or more processors 112 and memory 114. The memory 114 may include applications, modules, and/or data to support a mobile group payment service 116 (or simply "payment service"). In some embodiments, the payment service 116 may include a transaction request module 118 for initiating a transaction via the group account. For example, a member of the group 102 may wish to engage in a payment transaction with the entity 110. The transaction request module 118 may enable the group 102 to transmit a payment, make a payment request, receive a payment, and/or conduct other transactions with another group or an individual, such as with the entity 110. As discussed herein, a payment may include a transfer of money, currency, credits, points, shares, or any other medium that may be transacted.

In some embodiments, the payment service 116 may include an authorization module 120. The authorization module may be used to verify and approve/deny interactions between members of the group 102 and the group account. For example, a member of the group may initiate a transaction request via the transaction request module 118 to transfer a payment from the group 102 to the entity 110. The authorization module 120 may verify aspects of the requested payment transfer to ensure that the payment was intended, is permissible, and includes the correct recipient, among other possible factors to verify. The authorization module 120 may verify information by contacting members of the group 102, referencing account information, or by other techniques described herein.

The payment service 116 may also include an account information module 122 for providing information on the group account. For example, the group account may include a list of members, transaction history, permissions, and other group account settings and/or information. The account information module may allow a member of the group 102 to interact with the group account, thereby enabling the member to make changes to the group account or retrieve information regarding the group account.

In accordance with one or more embodiments, a client device, such as the client device 102(2), may be equipped with a user interface (UI) 124 to provide access to a group account 126. For example, a member of the group 102 may communicate with the host 104 via the user interface 124 on the client device 102(1)-(N) to interact with the group account 126. The group account 126 may be manipulated by the group 102, either directly or indirectly, using the transaction request module 118, the authorization module 120, and/or the account information module 122. Illustrative user interfaces are described below in more detail with reference to FIGS. 8 and 9.

Figure 2:
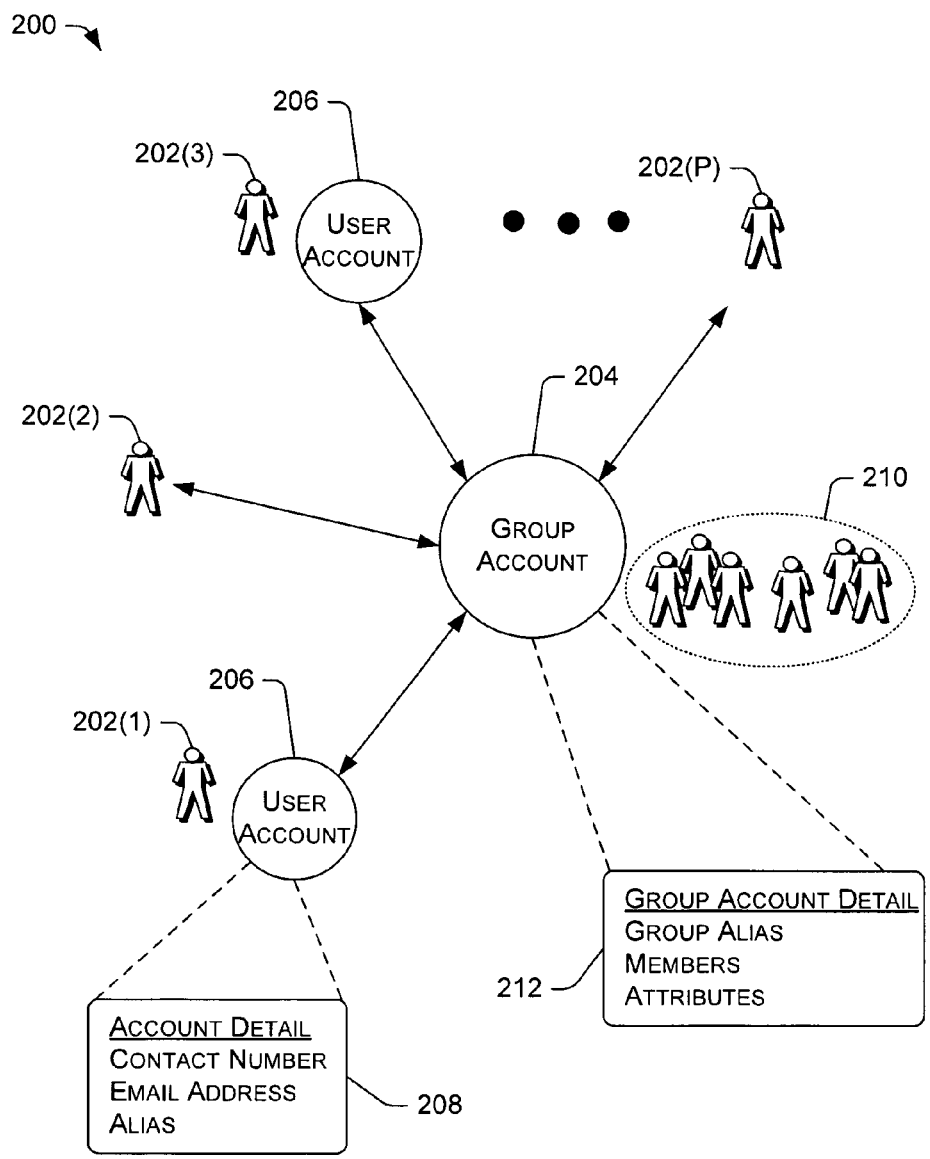
FIG. 2 illustrates an embodiment of a mobile group payment service in which individual members interact with a group account.

FIG. 2 illustrates an embodiment of a mobile group payment service 200 in which individual members 202(1), . . . , 202(P) interact with a group account 204. In some embodiments, the group account may reside on the servers 108(1)-(M) in FIG. 1. The members 202(1)-(P) may be people, companies, or other entities that may be identified by unique information. For example, a member 202(1) may have a user account 206 that includes account detail information 208 such as a contact number (e.g., a mobile telephone number), an email address, and an alias (e.g., unique name identifier). In some embodiments, the user account 206 may be a transaction authorization service as disclosed in U.S. patent application Ser. No. 11/546,534 entitled "Transaction Authorization Service" filed on Oct. 10, 2006. Alternatively or additionally, the user account 206 may be a bank account (e.g., checking or savings account), a credit card, or another financial services account. Other members, such as member 202(2) may not include an individual user account 206 while still maintaining membership with the group account 204. Similarly, other members may include member information such as a contact number, email address, and alias.

As shown in FIG. 2, the members 202(1)-(P) interact with the group account 204, thus creating a group of members represented by a group 210. Each member in the group 210 may be included in group account detail information 212. The group account detail information 212 may include a group alias, a list of members such as the members 202, and attributes, among other possible group account information.

Figure 3:
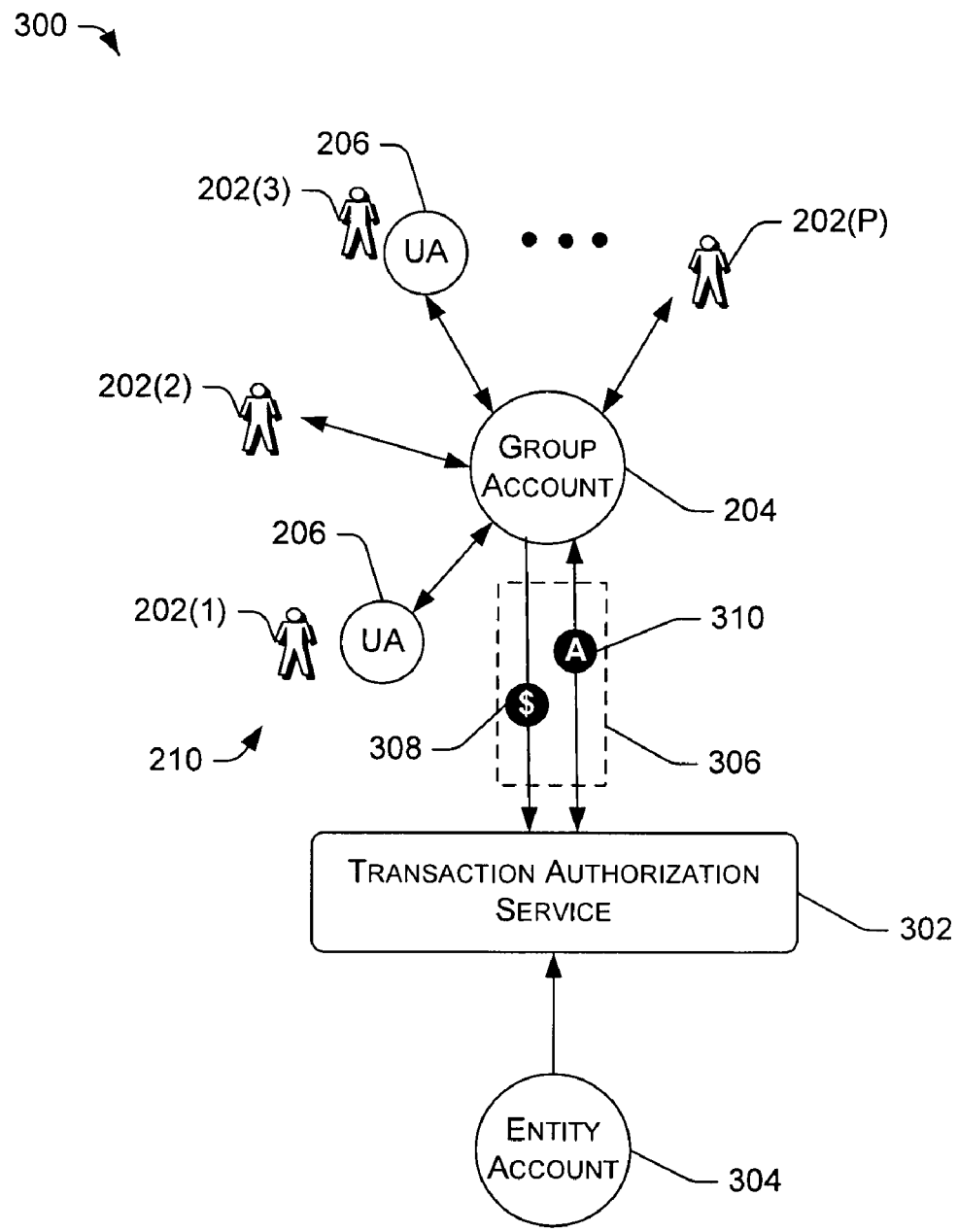
FIG. 3 illustrates an embodiment of a mobile group payment service including a transaction authorization service to facilitate transactions with an entity account.

FIG. 3 illustrates an embodiment of a mobile group payment service 300 including a transaction authorization service 302 to facilitate transactions with an entity account 304. The group account 204 may be in communication with the transaction authorization service 302 via communication lines 306. For example, the transaction authorization service may reside on the servers 108(1)-(M) in FIG. 1, while the communication lines 306 may include the network 106 in FIG. 1, such as wireless or wired communication lines.

In accordance with one or more embodiments, the mobile group payment service 300 may enable a member, such as member 202(1), to initiate an action with the group account 204. The initiated action may involve an account communication 308 between the group account 204 and the transaction authorization service 302. For example, the member 202(1) may initiate a payment request from the group account 204 to the entity account 304. An authorization communication 310 may occur between the transaction authorization service 302 and the group account 204 to verify the initiated action. If the initiated action is authorized, as described further below, the payment may be transferred between the group account 204 and the entity account 304.

The communication lines 306 may support various types of communications which may enable direct or indirect communications with members 202 via the client devices 102(1)-(N) in FIG. 1. For example, the initiated request may be communicated via a SMS message or web-based command using the user interface 124. The initiated request may proceed via the account communication 308 to the transaction authorization service 302. In turn, the transaction authorization service 302 may transmit a second communication via the authorization communication 310, such as an email, a voice communication, or other communications, to determine if the initiated request is authorized by one or more members of the group 210. In some embodiments, the account communication 308 and/or the authorization communication 310 may occur directly between the members 202 and the transaction authorization service 302 while in other embodiments, at least a portion of the communications may be routed through the group account 204.

Illustrative Operation

The disclosure will now be described using an illustrative operation. At times, the illustrative operation will be described with reference to elements included in the illustrative system architecture 100. The illustrative operation includes an "Illustrative Configuration" section describing techniques for initializing and maintaining a mobile group payment service, an "Illustrative Allocations" section describing populating the group account, an "Illustrative Payment" section describing transacting with the group account, and an "Illustrative Authorization" section describing group account authorizations, each section discussed in turn.

Illustrative Configuration

Figures 4A, 4B:
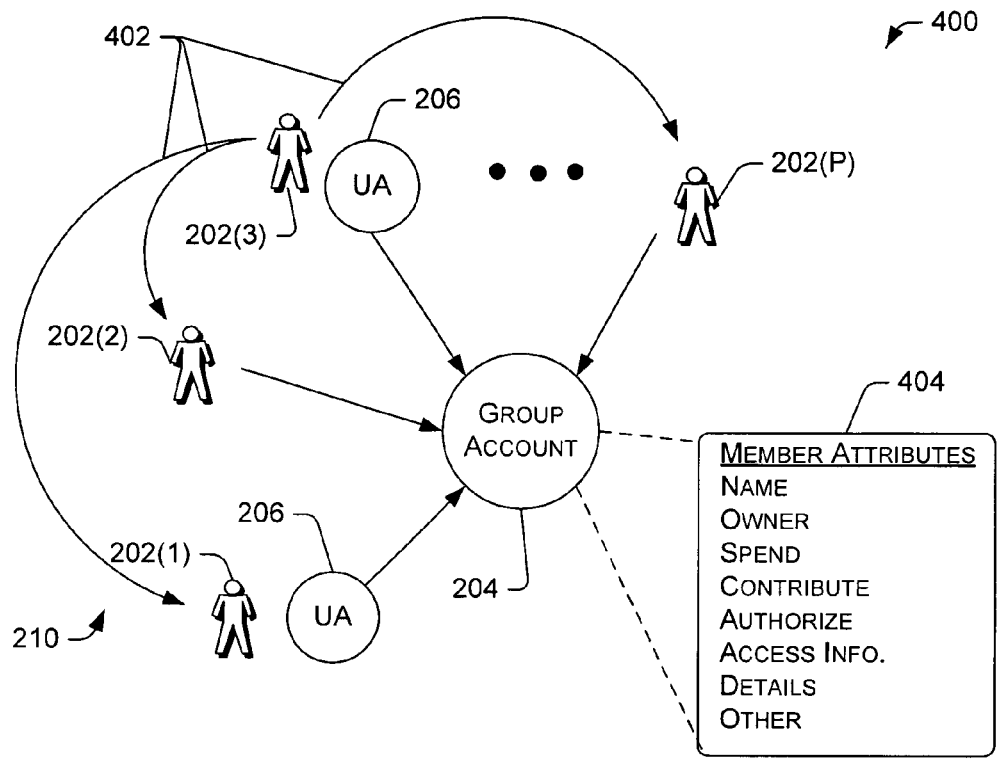
FIG. 4A illustrates an embodiment of a mobile group payment service enabling members to join a group account that may include member attributes.
FIG. 4B illustrates an example data structure of member attributes associated with members of the group account of FIG. 4A.

FIG. 4A illustrates an embodiment of a mobile group payment service 400 enabling the members 202 to join the group account 204. In some embodiments, a portion of the members 202(1)-(P) may initiate invitations 402 to other members to facilitate formation of the group 210. For example, the member 202(3) may create the group account 204 using a sign-up process or other group account initialization process. The group account 204 may be created using one or more communication mediums, such as without limitation a web-interface provided by the host 104 in FIG. 1, an ad hoc SMS text messaging command, and/or an automated voice system. In some instances, users having the user accounts 206 may import account information to a group account, thus simplifying the creation of the group account 204.

The member 202(3) may invite other members to join to group account. For example, the group account 204 may reside on the host 104, which may facilitate sending invitations 402 to the other members, such as via an email, a SMS text message, or a voice communication. In addition, the member 202(3) may submit information about the invited members, such as contact information (e.g., telephone number, email, etc.).

In accordance with embodiments, the group account 204 may include member attributes 404. The member attributes may include various data fields and/or identifiers such as without limitation: name, owner, spend, contribute, authorize, access information, details, and/or other. In some embodiments, the member that initializes the group account, such as the member 202(3), may be an owner of the group account 204. Other members may also be owners of the group account 204 and may or may not contribute to initializing the group account. For example, owners may have a higher interest or rights in the group account 204, such as rights to add or remove members or transfer interests in the group account. Some of the member attributes 404 may include the name of the member, whether the member is entitled to spend money from the group account, contribute money to the group account, authorize group account transactions, and/or access information related to the group account. In addition or alternatively, other member details or information may be included in the member attributes 404.

FIG. 4B illustrates an example data structure 406 of member attributes 404 associated with members of the group account 204 of FIG. 4A. For discussion purposes, the data structure 406 is shown with only a portion of the attributes listed in the member attributes 404, although more or fewer member attributes may be included in the data structure. The data structure 406 includes a member field 408, an owner field 410, a spend field 412, and an authorize field 414. In accordance with embodiments, the example data structure 406 may be implemented by the payment service 116, such as by the account information module 122, residing on the servers 108 (1)-(M) as shown in FIG. 1.

Each member may be listed in the member field 408 of the data structure 406, such as by the member's name, alias, contact information, etc. One or more members may be designated as owners in the owner field 410. As described above, the owners may have special privileges such as the ability to modify the member attributes 404, or other special privileges which are not accessible by members that are not owners. The spend field 412 may determine whether a member (regardless of owner status) is entitled to spend funds in the group account 204. For example, as shown in FIG. 4B, the member 202(1) is not authorized to spend funds of the group account.

The authorization field 414 may entitle members to authorize actions by other members, such as a request to spend funds of the group account. In some embodiments, more than one member may be selected to authorize a request to spend group account funds. For example, authorizations may be conducted using a voting process which may require a predetermined threshold quantity or percentage of affirmative authorizations prior to approving the pending request.

In some embodiments, the member attributes 404 in FIG. 4A may include a hierarchical organization. For example, members may be organized (ranked) in a group that includes a president, vice president, secretary, etc., or likewise, other organizing structures (e.g., levels) may be used to implement varied activity permissions for the members 202(1)-(P) of the group 210.

In an example, a group of members may desire to form a group account, such as the group account 204, for their game club. A first member may be designated as an owner and initiate the group account, such as by using user interface 124 via the client device 102(2) shown in FIG. 1. The account initialization may include transmitting information to the host 104, such as an alias "GameClub" for the group account. The owner may initiate an invitation to other members of the game club. In some embodiments, the owner may populate at least a portion of the member attributes 404 for the invited members. The invited members may accept their invitations, such as by communicating with group account via the host 104. Once enabled, the group account "GameClub" may be used to collect money from the members before a planned event, and transmit funds to purchase goods, services, and/or otherwise consumable elements for the group, such as food and beverages. The group may select a member having spending permission to purchase the food and beverages on behalf of the group. The purchase may require an authorization by one or more of the other members of the group, thus providing additional security for the allocation of the group's funds.

Illustrative Allocations

Figure 5A:
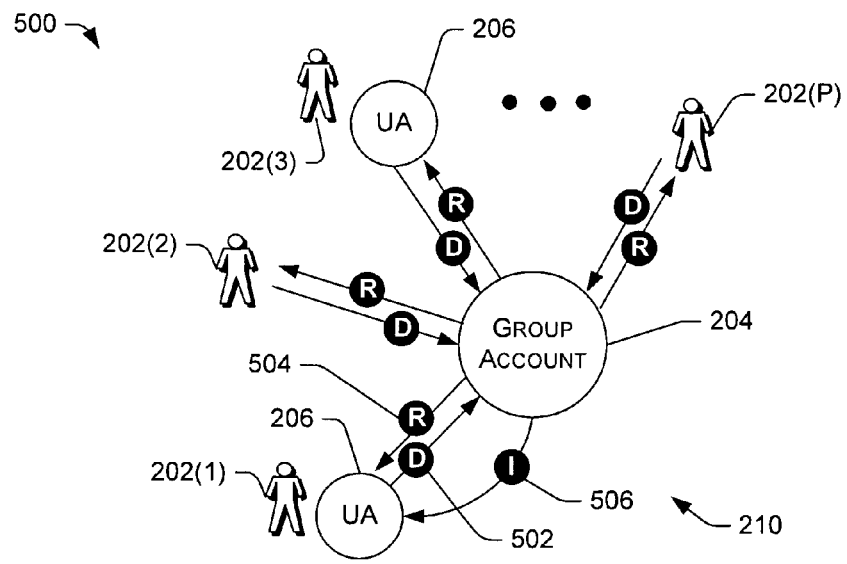
FIG. 5A illustrates messaging between members and the group account where the messaging may include payment requests and payments to the group account by members.

FIG. 5A illustrates an embodiment of a mobile group payment service 500 enabling messaging between members and the group account 204 where the messaging may include payment requests and payments to the group account by members. At times, such as during an initialization process, the group account 204 may need deposits of funds or other transfers to populate the group account via a deposit 502. In some embodiments, the group account 204 may be populated by the members, such as the members 202(1), 202(3) via transfers from the user accounts 206. Additionally or alternatively, the group account 204 may be populated via a direct transfer from a bank account, credit card, or electronic transfers, paper currency, checks, or other currency transfer processes by members who may not have the user account 206.

In an example, the member 202(1) may deposit funds into the user account 206. The member 202(1) may transmit at least a portion of the deposited funds to the group account 204, such as by using a transaction authorization service payment. In another example, the member 202(2) may wire funds to the group account 204 via a telephone wire service, therefore populating the group account 204 without an intermediary user account such as user account 206.

In accordance with some embodiments, the mobile group payment service 500 may enable members 202(1)-(P) to initiate a deposit request 504. For example, the members of a group "FlowerClub" may desire to collect money to buy a friend some flowers using the group account 204. To populate the group account 204 call "FlowerClub," a member, such as the member 202(1), may create the deposit request 504 to the other members to deposit funds. The deposit request 504 may include a specific deposit value, a comment, or other relevant information in a message to the other members. For example, the deposit request 504 may communicate to the members: "Please deposit 5 dollars to FlowerClub for purchase."

The deposit request 504 may be created via a messaging service, such as without limitation an email, a web-interface, a telephone call, or a SMS text message. For example, the mobile group payment service 500 may facilitate SMS text messaging commands using standardized formats to request deposits from other members, such as: "Request 5 FlowerClub Tim's Birthday" which will initiate the deposit request 504 to each member for 5 dollars for an event "Tim's Birthday." After a request, the requested members may deposit funds via the deposit 502.

In some embodiments, the member initiating the deposit request 504 may be notified when one or more of the deposit requests are fulfilled by deposits from the other members. For example, the member 202(1) may initiate the deposit request 504 so the member can purchase flowers with the group account 204. The member 202(1) may desire to know when the other members, such as members 202(2)-202(P), have submitted the deposit 502, enabling the member 202(1) to proceed with the purchase of the flowers. In other embodiments, the mobile group payment service 500 may facilitate providing information 506 such as a balance update or other information to enable the member 202(1) to be updated on the status of the request and/or balance of funds in the group account 204. In yet another embodiment, the information 506 may enable the member 202(1) to resend the request or take other appropriate action to expedite populating the group account 204 with funds from the other members.

Figure 5B:
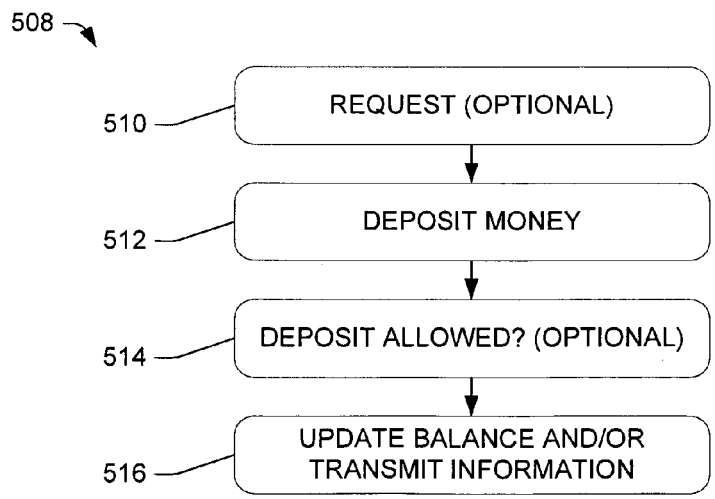
FIG. 5B is a flowchart of an illustrative process for messaging and payments between members and the group account.

FIG. 5B is a flowchart of an illustrative process 508 for providing messaging and payments between members and the group account 204, described with reference to FIG. 5A. The process 508 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described through this disclosure, in addition to process 508, shall be interpreted accordingly.

As shown in FIG. 5B, the deposit request 504 may be initiated at 510. The deposit request 504 may be created by a member of the group 210 or by other occurrences. For example, the deposit request 504 may be generated when the balance of the group account 504 drops below a predefined balance threshold, during an interval, such a monthly request, or during other occurrences. For example, the group account 204 may be used to pay for rental space for the group, which can require a periodic rental payment. The deposit request 504 may be initiated and transmitted to the members prior to the rental payment due date, thereby enabling the members of the group to execute the deposit 502 of funds into the group account 204.

At 512, members may provide the deposit 502 to the group account 204 in response to the request 504. In some embodiments, at 514, the mobile group payment service may confirm the deposit 502 is allowed by the member providing the deposit. For example, in some instances the members of a group may want to restrict the amount of deposits by one or more of the members, such as when the group account 204 is used to purchase an element (e.g., gift) for one of the members. In other instances, members may desire to restrict members from "picking up the tab" by making unrequested deposits. In some embodiments, the request 504 may be configured to verify if the deposit is allowed at 514.

At 516, the group account 204 may provide a balance update and/or transmit information, such as information 506 to one or more members of the group. For example, the group account may notify a member when a desired balance of the group account 204 has been attained or when some or all of the members have executed the deposit 502 of funds in response to the request 504.

Illustrative Payment

Figures 6A, 6B:
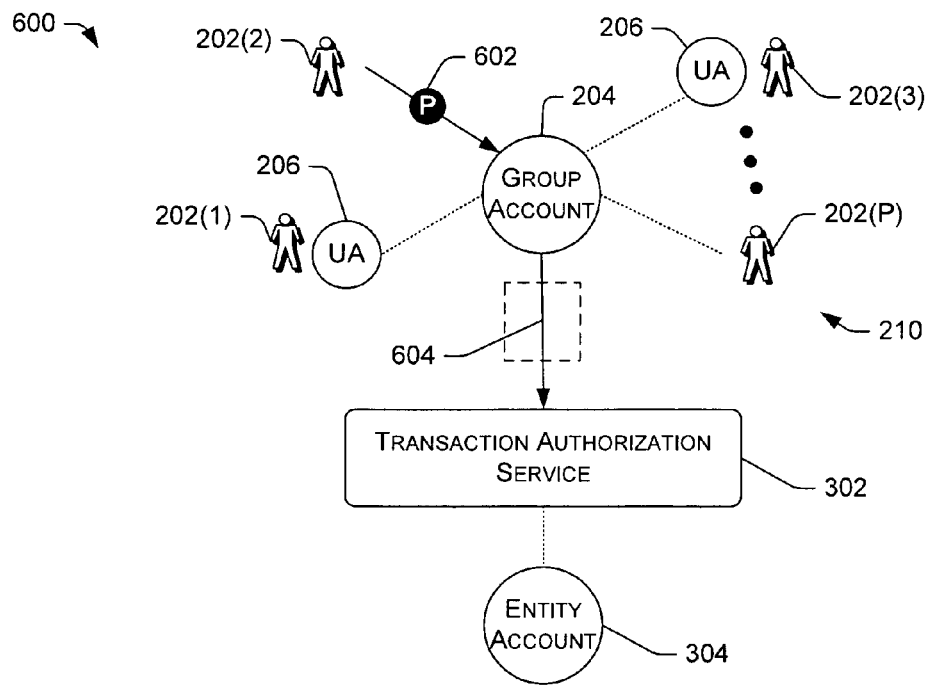
FIG. 6A illustrates a request by a member to transmit a payment from the group account to an entity account via a transaction authorization service.
FIG. 6B illustrates an example data structure of spending details for members of the group account of FIG. 6A.

FIG. 6A illustrates an embodiment of a mobile group payment service 600 enabling a payment request by a member to transmit a payment from the group account 204 to the entity account 304. In accordance with embodiments, a member, such as member 202(2) may act on behalf of the group 210 to initiate a payment request 602 from the group account 204 to the entity account 304. The payment request 602 may facilitate a transfer of funds from group account based on various factors of the mobile group payment service 600. For example, the member 202(2) may be required to be designated as having spending authority in the member attributes 404 shown in FIG. 4A, and field 412 of the data structure 406 shown in FIG. 4B.

In one or more embodiments, the payment request 602 may be transmitted via a communication 604 such as a web-interface communication, an email, a telephone service, an SMS text message, or via other communications to the transaction authorization service 302. For example, SMS text commands may be established to enable the member 202(2) to request a payment to the entity account 304 such as: "Pay 10 FlowerShop FlowerClub for Tim" where "FlowerShop" is the entity account 304, "FlowerClub" is the group account 204, and "for Tim" is an optional comment. In some embodiments, the payment request 602 may include a multimedia message such as text and voice media communications.

In some embodiments, other permissions may be necessary before the funds from the group account 204 may be transmitted to the entity account 304. For example, the payment request 602 amount may be referenced against a spending limit for the member 202(2) that is initiating the payment request. In addition or alternatively, the payment request 602 may require authorizations by other members, which will be described in greater detail below. Further, a balance inquiry of the group account 204 may be performed in response to the payment request, such as to ensure that sufficient funds are available for the requested payment.

FIG. 6B illustrates an example data structure 606 of spending details for members of the group account of FIG. 6A. For discussion purposes, the data structure 606 is shown with illustrative headings representing example data fields in the data structure 606, although more or fewer data fields may be included in the data structure. The data structure 606 includes a member field 608 and various spending permissions 610-616, each described in turn. In accordance with embodiments, the example data structure 606 may be implemented by the mobile group payment service 116, such as by the transaction request module 118, residing on the servers 108(1)-(M) as shown in FIG. 1.

A first field 610 may include a spending limit that does not require an authorization. An authorization, as further described below, is permission by one or more of the other members (authorizers) of the group 210. For example, the member 202(2) may spend up to $50 before she has to obtain an authorization on the payment request 602. A second field 612 may include a spending limit that requires a majority of the authorizers. A third field 614 may require a unanimous authorization by the authorizers in order to process the payment request 602 up to a specified spending limit. A fourth field 616 may include an absolute spending limit for a member.

Illustrative Authorization

Figure 7A:
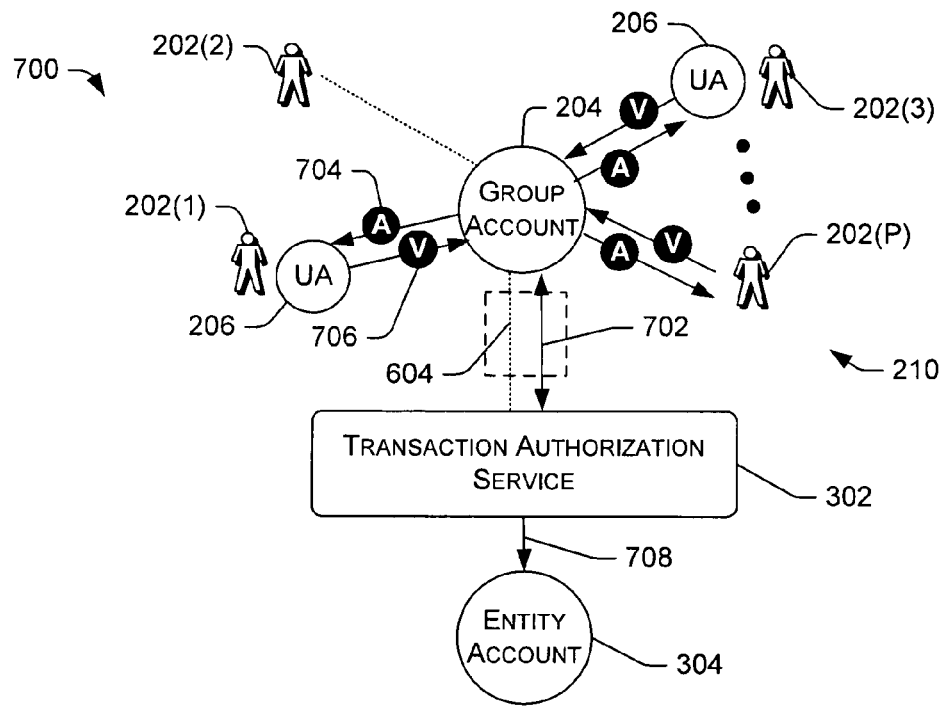
FIG. 7A illustrates an embodiment of an authorization request from a transaction authorization service to authorization members associated with the group account.

FIG. 7A illustrates an embodiment of a mobile group payment service 600 enabling an authorization request from the transaction authorization service 302 to authorization members via the group account 204. In some embodiments, upon receiving a request for payment, such as the payment request 602 via the communication 604, the transaction authorization service 302 may facilitate obtaining member votes by one or more of the other members of the group 210. Additionally or alternatively, the authorization process may be used for other transaction requests by members of the group 210.

The transaction authorization service 302 may transmit an authorization communication 702 to members of the group account 204, either directly or indirectly. Members selected to authorize the action (e.g., payment request 602) may be transmitted an authorization request 704. The authorization request 704 may be communicated to the authorizing member via any type of communication, such as without limitation a voice automated message, an email, an SMS message, or using other communications. The authorizing members, such as members 202(1), 202(3)-202(P) may respond to the authorization request 704 by submitting a vote 706. For example, the member 202(1) may respond to that authorization request by selecting a command during an automated voice system to indicate an approval of the payment 602 while member 202(3) may deny the payment request by emailing the transaction authorization service 302.

As discussed above with reference to FIG. 6b, the data structure 606 may provide data for an algorithm used to determine the voting results necessary for the payment request 602 to be approved. If the requisite votes are received which indicate an approved payment request, the payment may be transmitted from the group account 204 to the entity account 304 via a transfer 708.

In addition to authorizing the request, authorizing members may also be prompted or required to enter other information to complete the authorization. For example, the authorizing member may be required to enter a personal identification number (PIN) or password, which may provide additional security and/or verify the identity of the authorizing member prior to accepting the member's vote.

Figure 7B:
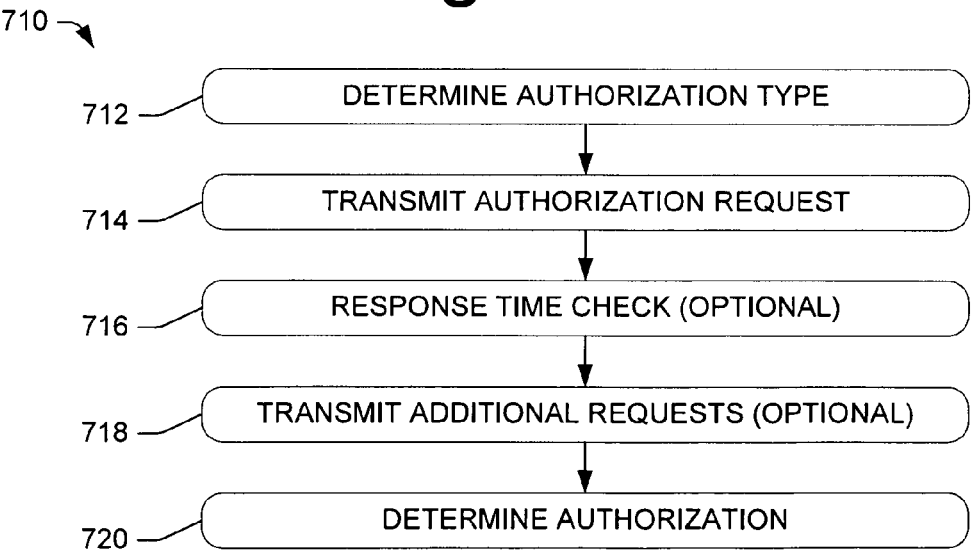
FIG. 7B is a flowchart of an illustrative process for authorizing a payment request.

FIG. 7B is a flowchart of an illustrative process 710 for authorizing a payment request. At 712, the authorization type is determined by the transaction authorization service 302. For example, the authorization type may require at least two members to approve of the payment request 602. In some embodiments, the authorization type may include querying at least a portion of the other members of the group 210 to obtain an authorization vote 706 to achieve a predetermined quantity threshold and/or a predetermined percentage threshold.

At 714, the authorization request may be transmitted via a communication 702 from the transaction authorization service 302 to the authorizing members of the group 210. In some embodiments, the transaction authorization service 302 may directly communicate with the authorizing members. Additionally or alternatively, the group account 204 may provide distribution and receipt of the authorization requests 704 and votes 706 between the authorizing members and the transaction authorization service 302.

In accordance with one or more embodiments, the transaction authorization service 302 may perform a response time check at 716. The response time check may facilitate an expedited authorization process in response to a payment request. For example, a user may desire a substantially synchronous authorization process. Therefore, in some embodiments, the transaction authorization service 302 may implement a time-out (using the response time check) after an expiration of a predetermined response time after an authorization request has been transmitted to the authorizing member and does not include a corresponding authorization response. For example, the response time check may limit the number of rings and/or call-backs for a telephone authorization process. An email authorization may have a timeout after a predetermined number of seconds, minutes, or hours. Often, the timeout period may be determined based on the type of transaction. A point of sale transaction (e.g., at a checkout of a market) may require a quick authorization, thus a short response time check while a real estate transaction may allow for a longer time check because of the typically long duration of such a transaction.

Additional authorization requests may be transmitted to the authorizing members at 718. For example, if an authorizing member does not respond during a predetermined response time determined at the response time check 716 or for other reasons, an additional authorization request may be transmitted to the authorizing member. For example, a first authorization request may be transmitted to the authorizing member's telephone number while a second authorization request may be transmitted to the member's email when the first request enters a timeout or is otherwise ineffective to obtain an authorization response. In some embodiments, a substitute authorizing member may be selected by the transaction authorization service 302 and an authorization request may be transmitted to the substitute authorizing member.

At 720, the transaction authorization service 302 may determine the outcome of the authorization votes 706. In some embodiments, the transaction authorization service may use logic for tallying the votes 706, such as counting a non-responsive authorization member's vote as a null, a void, or an affirmative vote. If the transaction authorization service 302 determines the payment request 602 (or other activity involving the group account 204) is authorized, the payment may be initiated via the transfer 708. However, if the transaction authorization service 302 determines the payment is not authorized, the payment may not be transferred. In some embodiments, an unauthorized payment request may initiate a communication to the member that requested the payment, such as to notify the member of the denied authorization.

FIG. 7C illustrates an example data structure 720 of authorization details for members of the group account of FIG. 7A. For discussion purposes, the data structure 720 is shown with illustrative headings representing example data fields in the data structure, although more or fewer data fields may be included in the data structure. The data structure 720 includes a member field 722 and various voting attribute fields 724-730, each described in turn. In accordance with embodiments, the example data structure 720 may be implemented by the mobile group payment service 116, such as by the authorization module 120, residing on the servers 108(1)-(M) as shown in FIG. 1.

A first field 724 may determine whether a member of the group 210 is eligible to vote. For example, some members of the group may not be eligible to vote based on factors such as the member attributes 404 from FIG. 4A. A second field 726 may enable a member to always vote in an authorization request. For example, an owner of the group account 204 may desire to be involved in each authorization request. In some embodiments, a third field 728 may provide a member with an absolute no vote, thus rejecting a payment request regardless of the votes from other members. Finally, a fourth field 730 may enable random selection of voters for an authorization process. For example, a payment request may require four members to provide an authorization vote while the group 210 includes many more members. The four authorizing members may be selected randomly from members included in the field 730.

In accordance with one or more embodiments, other authorization processes may be implemented in the mobile group payment service 116, such as by the authorization module 120 in FIG. 1. For example, a member may be excluded from authorizing a particular payment in an instance when the member is a beneficiary of the payment (e.g., a surprise gift, etc.). In some embodiments, the vote of the authorizing member may be weighed proportionally to the member's contributions to the group account 204, the member's attributes (e.g., rank), or by other metrics.

FIG. 7D illustrates an embodiment of authorization settings 732 that may be associated with the transaction authorization service 302 as described with reference to FIG. 7A. The authorization settings 732 may be implemented in the authorization module 120 in FIG. 1, such as to configure the transaction authorization service 302. The authorization settings 732 may include a first field 734 to randomly select members for authorizing a payment request. A second field 736 may enable activation or deactivation of an absolute no vote as described above. In some embodiments, an authorization quantity at a third field 738 or an authorization percent at fourth field 740 may be selected to determine the tallying of the authorization votes 706.

Illustrative User Interface

Figure 8:
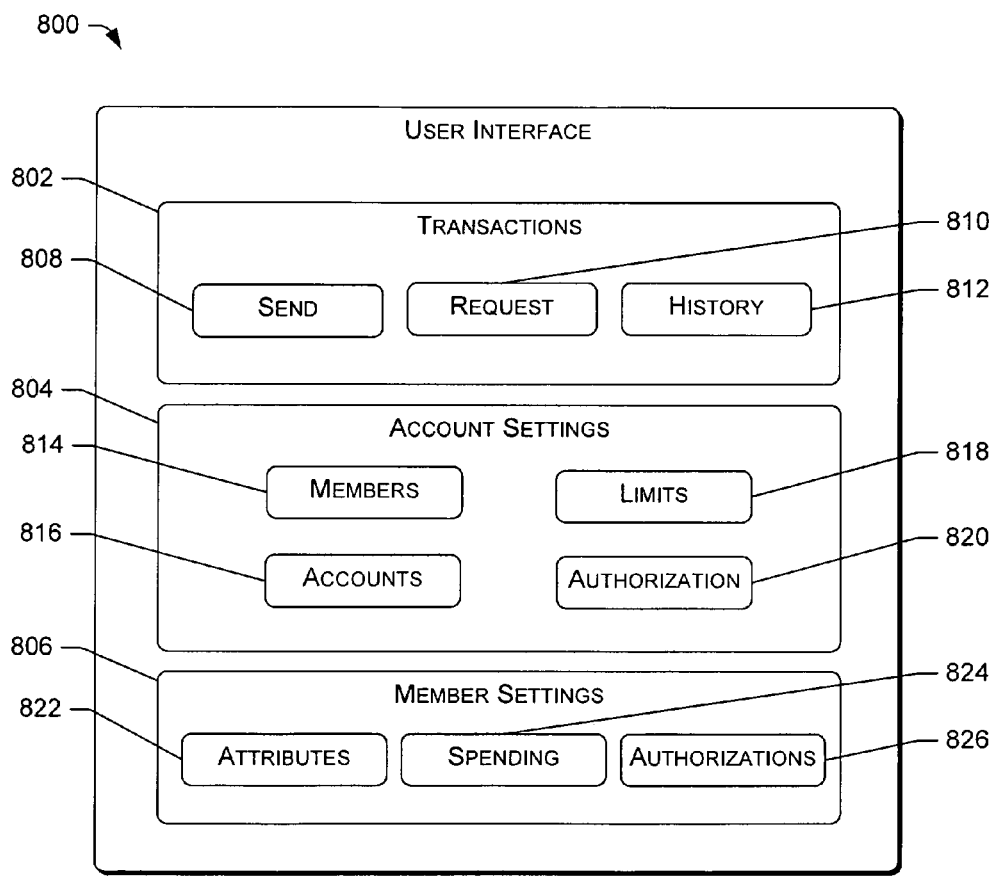
FIG. 8 illustrates an example mobile group payment service page to enable manipulation of the group account.
Figure 9:
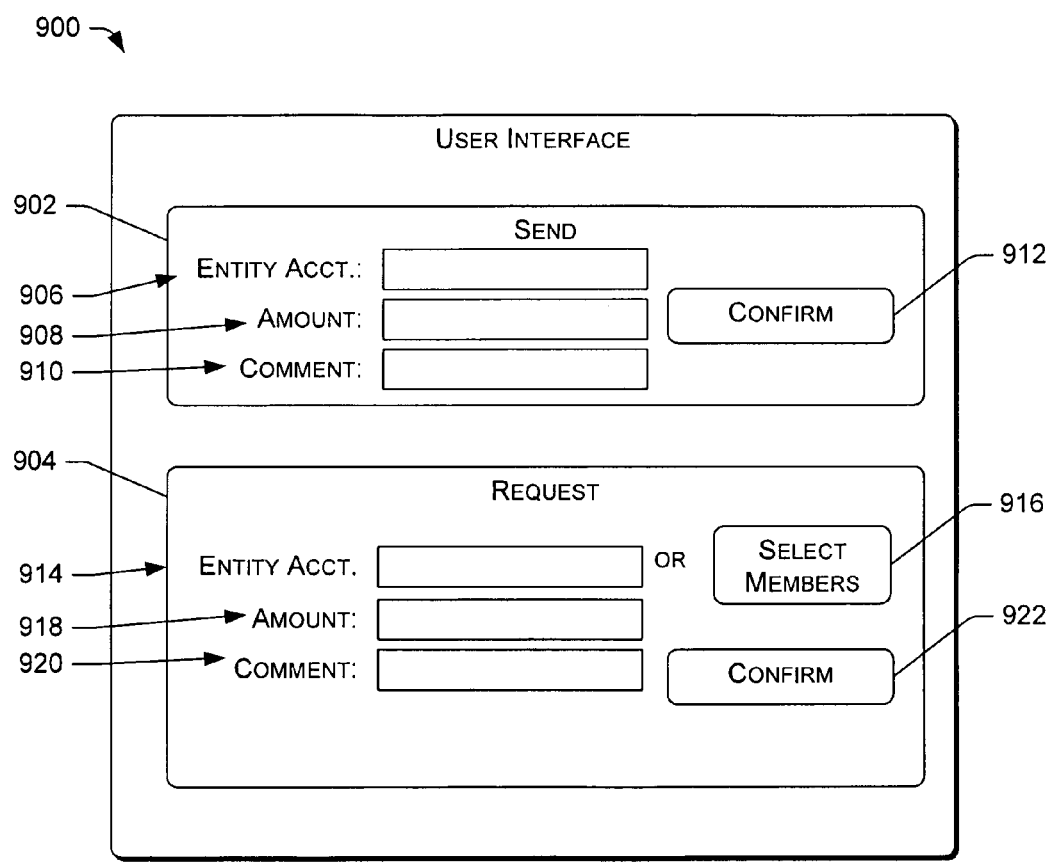
FIG. 9 illustrates an example mobile group payment service page to enable messaging as described in FIG. 5A.

FIGS. 8 and 9 represent example user interface (UI) pages to enable one or more members of the group 210 to interact with the group account 204. The UI pages may reside on the servers 108(1)-(M) in FIG. 1, and upon a request from a client, the page may be served via the network 106 to a client device 102(1), ..., 102(N) associated with a member. In some embodiments, the UI pages may include more or fewer presentations, or the UI pages may be displayed using a series of sub-pages.

FIG. 8 illustrates an example mobile group payment service page 800 to enable manipulation of the group account 204. The page 800 includes user interface elements for entering, viewing, and/or modifying information. The page may include a transactions section 802, an account settings section 804, and a member setting section 806, among other possible sections for providing manipulation of the group account 204.

The transaction section 802 may include a send element 808 to enable a member to create a payment request, such as the payment request 604. A request element 810 may enable a member to request payments from other members or from entity accounts, such as the entity account 304. For example, the entity account 304 may be another group account that owes the group account 204 a payment for a transaction. A history element 812 may enable a member to request transaction history, such as a balance, specific transaction data, member contribution data, or other information related to the group account.

In accordance with some embodiments, the account settings section 804 may include a members element 814 for manipulating the member list of the group account 204. An accounts element may enable members to add, remove, or modify transaction accounts, such as user accounts 206 in FIG. 2, or other accounts that may facilitate deposits or transactions with the group account 204. Other accounts may include, without limitation, member credit card accounts, bank accounts, and/or electronic payment accounts. A limits element 818 may facilitate creating, deleting, or modifying limits for the account. For example, the group account 204 may have a total balance limit for the group account. Finally, an authorization element 820 may facilitate adjustment of authorization settings for the group account, such as the authorization settings described with reference to the authorization settings 732 in FIG. 7D.

The member settings section 806 may include an attribute element 822 for accessing member information, such as the member attributes 404 in FIG. 4A. A spending element 824 may facilitate creation, modification, or deletion of spending limits for each member, such as the spending limits in the data structure 606 in FIG. 6B. An authorizations element 826 may facilitate creation, modification, or deletion of the authorization rules for each member, such as the authorization in the data structure 720 in FIG. 7C.

FIG. 9 illustrates an example mobile group payment service page 900 to enable messaging as described with reference to FIG. 5A. In accordance with embodiments, the page 900 may include a send section 902 and/or a receive section 904. The send section may include an entity account field 906. The entity account field may enable a member to enter an entity account for a payment transaction, such as the entity account 304 in FIG. 3. An amount field 908 may be used to input a payment amount, such as an amount of money is United States dollars or another currency. A comment field 910 may allow a member to insert comments pertaining to the send transaction. The member may use a confirm element 912 to submit the payment request upon completion of the fields 906, 908, 910. In some embodiments, the comment field 910 may be an optional field.

The request section 904 may include an entity account 914 and/or a select members element 916 to enable a member to select recipients of the request. For example, a member may send a request to other members of a group, such as the group 210, to populate the group account 204 by selecting members from the select members element 916. Alternatively, the member may select an entity account as a recipient of the request for funds. A request amount field 918 may be similar to the amount field 908 and allow for entry of a currency value. Similarly, a request comment field 920 may be similar to the comment field 910 and allow for an optional entry to a comment associated with the request submission. Finally, a confirm element 922 may enable the member to submit the request for distribution to the entity account designated by the entity account 914 or the members selected by the select members element 916.

Although the page 800 and the page 900 are presented as user interfaces, other processes may be used to facilitate interactions with the group accounts which do not include a user interface. For example, a command structure may be implemented to enable a member to submit SMS text messaging having a predefined format to initiate actions with the group account. In addition or alternatively, an automated voice operated system may enable a member to interact with the group account 204.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method of transacting a payment, the method comprising:
   under control of one or more computer systems configured with executable instructions,
   associating a group of members with a group account of a transaction authorization service;
   receiving a payment request from a mobile device associated with a requesting member, the payment request initiating a payment from the group account and an entity account designated by the requesting member, the payment request transmitted via a first simple message system (SMS) text message;
   selecting at least one authorizing member from the members of the group, the at least one authorizing member being different than the requesting member and being selected based at least in part on a determination that the at least one authorizing member is not a beneficiary of the payment and further based at least in part on one or more attributes associated with the at least one authorizing member that indicate an authority to authorize the payment request;
   sending an authorization request for the payment to a mobile device associated with the at least one authorizing member, the authorization request transmitted via a second SMS text message; and
   receiving a third SMS text message as an authorization message from the at least one authorizing member in response to the authorization request, the authorization message either permitting the payment or denying the payment between the group account and the entity account.

2. The method as recited in claim 1, further comprising:
   transmitting a request for a deposit of funds into the group account by the members in response to the receiving a payment request;
   receiving the deposit of funds from one or more of the group of members prior to executing the payment to the entity account and at least partly in response to the payment request; and
   executing the payment to the entity account.

3. A method comprising:
   associating, via a server, a group of members with a group account of a transaction authorization service;
   receiving, at the server, a payment request from a requesting member, the payment request initiating a transaction between the group account and an entity account;
   transmitting a request for a deposit of funds into the group account by the members at least partly in response to the receiving a payment request;
   selecting two or more of the members as authorizing members of the group;
   sending, via a server, an authorization request for the transaction to destinations associated with the authorizing members of the group;
   receiving authorization messages from the authorizing members prior to an expiration of a response time, each of the authorization messages either authorizing or denying the payment request, and the response time being predetermined based at least partly on a type of the transaction; and
   issuing a payment associated with the payment request upon receipt of a threshold amount or percentage of authorization messages that authorize the payment request.

4. The method as recited in claim 3, wherein associating the group of members with the group account includes:
   registering an owner of the group associated with the account, the owner being one of the members; and
   registering at least a second member of the group based on at least one attribute determined by the owner.

5. The method as recited in claim 3, wherein selecting the two or more of the members as the authorizing members of the group includes retrieving an attribute for each of the two or more members that determines an eligibility to participate in a vote to authorize or deny the payment request.

6. The method as recited in claim 3, further comprising facilitating a monetary deposit into the group account by at least one of the members of the group.

7. The method as recited in claim 3, wherein receiving a payment request from a requesting member includes receiving a simple message system (SMS) text message.

8. The method as recited in claim 3, wherein the at least an authorizing member is a member other than the requesting member.

9. The method as recited in claim 8, further comprising sending the authorization request to two or more authorizing members, wherein authorization of the transaction is based upon a tally of authorization messages returned by the two or more authorizing members.

10. The method as recited in claim 3, further comprising:
    receiving a deposit from at least one of the members;
    determining whether the deposit is for an amount of the request; and
    transmitting a message to the respective member when the deposit is not the amount of the request based at least in part on the determining.

11. One or more non-transitory computer-readable media storing computer-executable instructions that, when executed on one or more processors, perform acts comprising:
    receiving a payment request by a requesting member of a group of members, the group of members being associated with a group account;
    randomly designating at least two or more of the members of the group as authorizing members;
    transmitting an authorization request to the authorizing members, the authorization request set to expire after a response time that is predetermined based at least in part on a type of the authorization request; and
    at a time after receiving an authorization approval from the authorizing members and at least partly in response to the receiving the payment request, allocating funds of the group account according to the payment request received from the requesting member.

12. The one or more computer-readable media as recited in claim 11, wherein receiving a payment request by a requesting member includes receiving the request by at least one of a voice activated communication or a SMS text message command.

13. The one or more computer-readable media as recited in claim 11, further comprising designating the requesting member as ineligible to be one of the authorizing members.

14. The one or more computer-readable media as recited in claim 11, further comprising requesting a deposit of funds from at least a portion of the group, the requested deposit communicated to the members via a SMS text message.

15. The one or more computer-readable media as recited in claim 11, wherein an authorization approval is determined as a function of one or more member votes from the authorization members.

16. The one or more computer-readable media as recited in claim 15, wherein the authorization approval is determined when the one or more member votes exceed a predetermined threshold value, the value including a number or a percentage.

17. A system comprising:
a processor; and
a memory comprising program instructions that are executable by the processor to implement a group transaction authorization service configured to:
receive a payment request from a transaction initiator of a group of members associated with a group account, the payment request being a request to transmit funds from the group account to an entity account specified by the transaction initiator;
determine whether the payment request is greater than a balance of available funds in the group account;
transmit a request to the members for a deposit of funds into the group account at least partly in response to receipt of the payment request when the balance of the group account is less than the funds in the payment request based at least in part on the determining;
transmit an authorization request to at least one member of the group other than the transaction initiator based at least in part on a determination that the at least one member is not a beneficiary of the requested transaction, the authorization request transmitted to a communication device associated with the at least one member; and
receive a vote at least partly in response to the authorization request, the vote facilitating a determination as to whether the requested transaction is authorized.

18. The system as recited in claim 17, wherein the payment request is authorized when a plurality of votes reaches a predetermined vote quantity threshold.

19. The system as recited in claim 17, wherein the payment request is authorized when a predetermined vote percentage threshold is obtained from the response message associated with the authorization request.

20. The system as recited in claim 17, wherein at least one member has two voting options that the at least one member may select from when voting, the at least two voting options including a standard vote that is tallied with other votes and an absolute rejection vote, and wherein a receipt of the absolute rejection vote from the authorization request results in the requested transaction being denied regardless of the other votes.

21. The system as recited in claim 17, wherein the at least one member of the group includes at least two members, and wherein the at least two members are chosen randomly from a selected group of eligible authorization members.

22. The system as recited in claim 17, wherein the group transaction service is further configured to:
monitor for a response associated with the authorization request, and
cancel the authorization request when the response is not received prior to expiration of a predetermined duration of time allocated for the response to the authorization request.

23. The system as recited in claim 22, wherein the group transaction service is further configured to transmit an additional authorization request to at least one other member of the group other than the transaction initiator at least partly in response to a cancelation of the authorization request, the additional authorization transmitted to a communication device associated with the at least one other member of the group.

24. The system as recited in claim 22, where the predetermined duration of time is based at least in part on a transaction type which is selected from a short duration associated with a purchase that is at a point of sale or a long duration associated with a purchase that is not at a point of sale.

25. The system as recited in claim 17, wherein the group transaction service is further configured to notify the transaction initiator when the deposit of funds into the group account are fulfilled by deposits from the members.

* * * * *